United States Patent [19]

Mizoguchi et al.

[11] 3,940,773

[45] Feb. 24, 1976

[54] LIQUID DROPLET WRITING MECHANISM

[75] Inventors: Akira Mizoguchi; Kiyoshi Yamamori; Yasutaka Hiromori, all of Kawasaki, Japan

[73] Assignee: Matsushita Electric Industrial Co., Ltd., Japan

[22] Filed: Aug. 14, 1974

[21] Appl. No.: 497,372

[30] Foreign Application Priority Data

Aug. 16, 1973 Japan ............................. 48-92199
Aug. 17, 1973 Japan ............................. 48-92578

[52] U.S. Cl. ............................. 346/140 R; 346/75
[51] Int. Cl.² ............................. G01D 15/16
[58] Field of Search ............................. 346/140, 75

[56] References Cited

UNITED STATES PATENTS

| | | | |
|---|---|---|---|
| 2,312,712 | 3/1943 | Hartline | 417/413 |
| 3,747,120 | 7/1973 | Stemme | 346/75 |
| 3,848,118 | 11/1974 | Rittberg | 239/102 X |

*Primary Examiner*—Joseph W. Hartary
*Attorney, Agent, or Firm*—Robert E. Burns; Emmanuel J. Lobato; Bruce L. Adams

[57] ABSTRACT

A writing mechanism for applying fluid droplets to a surface includes a chamber which is divided into an outer chamber portion and an inner chamber portion with a channel connecting the outer and inner chamber portions. The inner chamber portion is provided with a device which produces short duration pressure increases in the fluid in the chamber. The outer chamber portion is provided with an intermediate reservoir chamber which is in communication with an intake channel for the supply of liquid from a supply container and a discharge channel through which the liquid is discharged for deposition on the surface.

12 Claims, 3 Drawing Figures

LIQUID DROPLET WRITING MECHANISM

The present invention relates to an arrangement for applying fluid droplets to a surface, and more particularly to improvement to a mechanism for writing on paper with an ejected ink.

The speed of recording data on paper in, for example, a data processing system is limited for one thing by the capability of the writing mechanism, which in many cases is substantially less than that of the data processing system.

Because of the high speed capability of the ink ejection type writing mechanism, many proposals have been made in which the liquid is discharged onto the paper by application of electrical pulses, the liquid being ejected in a series of pulsed jets. The speed of the writing mechanism is in turn largely determined by the capability of the liquid responding to the rapidly occurring electrical pulses.

U.S. Pat. No. 3,747,120 discloses an ink ejection type writing mechanism which utilizes a piezoelectrical crystal as a means for creating pressure variations in the liquid, and which comprises an inner and outer chambers for accommodating the liquid, an intake channel communicating between a liquid supply container and the outer chamber. The outer and inner chamber is communicated by a connecting channel and which is provided in a position opposite to and axially aligned with the connecting channel. The outer chamber has a narrow width to permit the liquid in the intake channel to admit thereinto by capillary action. The piezoelectrical crystal is positioned adjacent the inner chamber and adapted to apply the varying pressure to the liquid in the inner chamber by electrical pulses applied thereto.

In order to meet the speed requirements of the date processing system, the writing mechanism should be driven by pulses occurring at a rate higher than 5 kHz, preferably in the range of 10 to 30 kHz. Under these circumstances, it is experienced that the fluid droplets are not satisfactorily discharged because of the slow response characteristic of the prior art writing mechanism.

Therefore, an object of the invention is to provide an improved arrangement for applying fluid droplets to a surface wherein the fluid is satisfactorily ejected by electrical drive pulses occurring at a rate up to the order of several tens kiloherz.

In accordance with one aspect of the present invention there is provided an improved arrangement for applying liquid droplets to a surface, comprising a liquid applying unit including a chamber having an intake channel connected to a liquid supply container and a discharge channel through which the liquid is discharged from the chamber into the atmosphere, means for producing short duration pressure increases in the liquid in the chamber, the chamber having means dividing the chamber into an outer chamber portion adjacent to the discharge channel and an inner chamber portion, a connecting channel in the dividing means connecting the outer and inner chamber portions, the connecting channel being axially aligned with the discharge channel and intake channel and the intake channel being communicated with the outer chamber portion. The invention is characterized by an intermediate reservoir chamber communicated with the outer chamber portion and with the intake channel to serve as a reservoir for the outer chamber portion, whereby the liquid discharged through the discharge channel is replenished with the liquid in the intermediate reservoir chamber to enable the liquid in the outer chamber portion to respond to the rapid variations of the short duration pressure increases.

The present invention is further characterized in that the ratio of the distance between the outer end of the discharge channel and the pressure producing means and to the diameter of the inner chamber portion adjacent to the pressure producing means which produces short duration pressure increases lies between 0.15 and 1.0.

The invention will become understood from the following description taken in conjunction with the accompanying drawing, in which.

Figure 1:
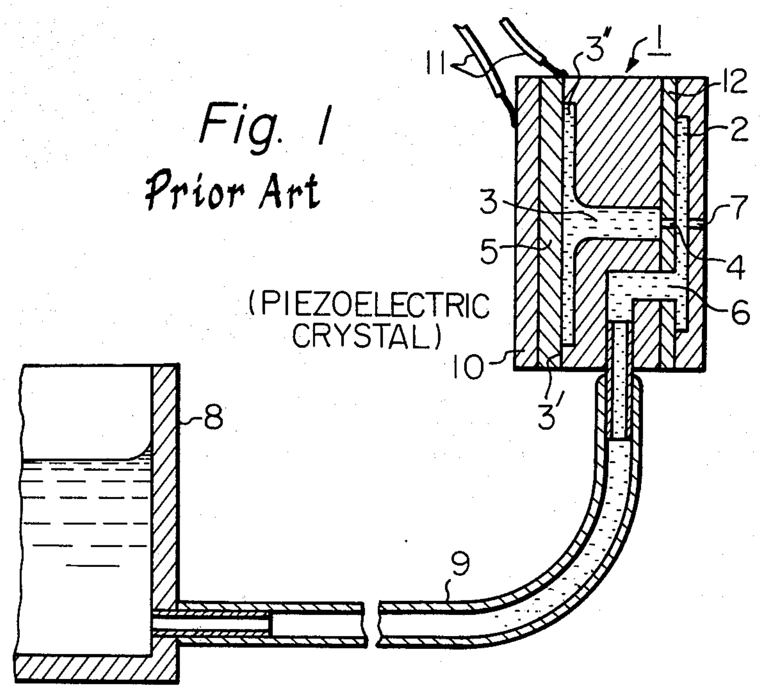
Fig. 1 Prior Art
FIG. 1 is a cross-sectional view of a prior art writing mechanism with a divided fluid chamber and a fluid container.

Prior to the description of the present invention, reference is made to a prior art writing unit in a simplified form. The writing unit 1 is provided with an outer chamber portion 2 and an inner chamber portion 3 which are in communication through a connecting channel 4 which is provided in a dividing plate 12 situated between and forming the separation of the chamber into the chamber portions 2 and 3. The connecting channel 4 is positioned in the dividing plate 12 so that it is directly opposite to and axially aligned with a discharge channel 7 which is provided at the outer end of the outer chamber portion 2 and opens to the atmosphere from the outer chamber portion 2. A circular metal plate or membrane 5 is fastened to the wall 3' of the inner chamber portion 3. The dividing plate 12 has an intake channel 6 which opens into the outer chamber 2 and is in communication with a fluid container 8 via a conduit 9. The container 8 may be disposed at a lower level than the discharge channel 7 because of the capillary forces existing in the channels communicating with the chamber portion 2. A piezoelectric crystal 10 is attached to the metal membrane 5 in any conventional manner. Conductive wires 11 are provided with one being electrically connected to the metal membrane 5 and the other to the exterior of the piezoelectric crystal 10. The wires 12 supply the control pulses to the crystal 10. The inner chamber portion 3 has its one end opposite to the outer chamber portion 2 a larger diameter portion 3'' which is in contact with the metal membrane 5. The cross-sectional area of the discharge channel 7 is substantially smaller than the cross-sectional area of the larger diameter portion 3''.

When the crystal 10 is activated by a pulse, fluid is discharged from the inner chamber portion 3 through the connecting channel 4, through the fluid layer in the outer chamber portion 2 and further through the discharge channel 7 whereupon it is applied to a writing surface. When the voltage pulse drops to zero the direction of the fluid stream in the connecting channel 4 is reversed and fluid is now sucked in through the outer chamber portion 2 from the container 8 via the intake channel 6. If the repetition rate of the applied pulses is increased and since the thickness of the outer chamber portion 2 and the cross-sectional area of the intake channel 6 are small to produce capillary forces associated with the liquid therein, a depletion of liquid occurs in the outer chamber portion 2 which causes an inflow of air through the discharge channel 7, and such inflow of air causes interruption of liquid discharged. Experiments show that when the pulse repetition rate is above 5 kHz, liquid is not substantially discharged from the discharge channel 7 because of the depletion of liquid in the outer chamber portion 2, and therefore the prior art writing unit is not capable of satisfactorily responding to the pulse repetition rate exceeding 5 kHz.

Figure 2:
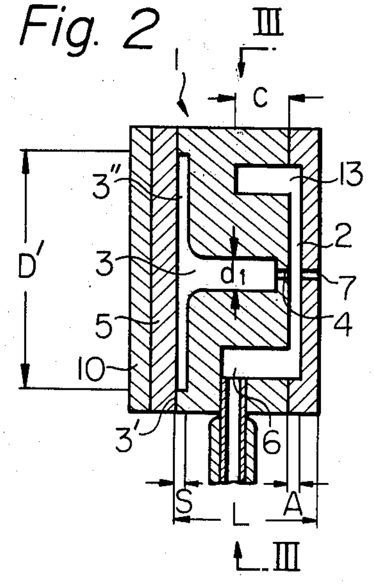
FIG. 2 is a cross-sectional view of a writing mechanism of a first embodiment of the present invention.
Figure 3:
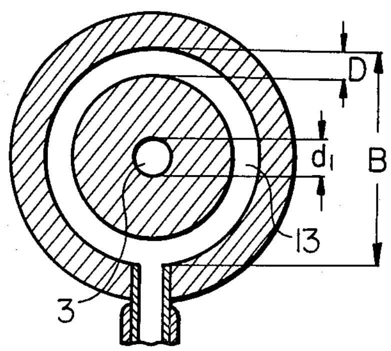
FIG. 3 is a cross-sectional view taken along the lines III—III of FIG. 2.

FIGS. 2 and 3 show one embodiment of the liquid applying unit of the invention, wherein like parts are numbered with numerals similar to that shown in FIG. 1. In accordance with the present invention, the writing unit 1 of the invention is generally similar in construction to that shown in FIG. 1 except that there is provided an intermediate reservoir chamber 13 which is in communication with the outer chamber portion 2. The reservoir chamber 13 is preferably formed into an annular groove which axially extends in a direction opposite to the outer chamber portion 2 to a depth greater than the spacing of the opposing walls of the outer chamber portion 2, and also in communication with the intake channel 6.

In the exemplary embodiment of the invention, the following parameters are used:

| | |
|---|---|
| a) Spacing A between the opposing walls of outer chamber portion 2 | 50 – 40 microns |
| b) Outer diameter B of outer chamber portion 2 | 6 mm |
| c) Diameter of discharge channel 7 | 50 microns |
| Length of connecting channel 4 | 30 microns |
| d) Ratio of distance L between the outer end of discharge channel 7 and metal membrane 5 to the diameter D' of larger diameter portion 3'' of inner chamber portion 3 | 0.15< L/D'< 1.0 |
| e) Depth C of annular groove 13 | 2 mm |
| f) Width D of annular groove 13 | 1 mm |

With these parameters, the writing unit 1 of the invention was activated satisfactorily with pulse repetition rates up to 30 kHz. The test showed that the writing unit operated satisfactorily in an extended period with the fluid droplets being ejected in a series of jet streams having a diameter of about 100 microns, over the entire range of the repetition rates.

In order to enhance the pulse frequency response characteristic of the writing unit 1, it is necessary to minimize the loss of pressure within the inner chamber portion 3 so as to effectively transmit the pressure caused by the metal membrane 5 to the connecting channel 4. For this purpose, it is preferable that the inner surface of the inner chamber portion 3 is coated to a thickness of about 20 microns with high polymers such as silicon resin, fluorin-containing resin, polyethylene resin or an organic metal compound chosen in consideration of the physical properties of the associated liquid by a known method such as painting, sputtering, evaporation or thermal decomposition. Such coating material, in addition to minimizing the loss of pressure, serves as a protective coating to avoid the possibility of the inner chamber portion 3 being corroded with the liquid material, and thereby extends the usable life of the writing unit. Alternatively, the writing unit 1 is formed of the material as referred to above in a known extrustion method whereby machining errors which might be otherwise introduced can be avoided.

It is found that where the writing unit 1 is activated with pulses of a repetition rate lower than 5 kHz, the dimensional parameters of the writing unit have substantially no influence on the liquid ejecting performance of the unit, that is, the frequency characteristic of the unit is not critical to the dimensions of the unit. However, when the unit is activated at a higher repetition rate in the range 10 to 30 kHz, due consideration should be given to the choice of the dimensional parameters. If the ratio of the distance (L) between the outer end of the discharge channel 7 and the metal membrane 5 to the diameter (D') of the larger diameter portion 3'' adjacent to the metal membrane 5, that is L/D', is greater than unity, no fluid is discharged from the discharge channel 7 when the pulse repetition rate reaches 5 kHz. On the other hand, if the ratio is smaller than 0.15 and the pulse repetition rate is 5 kHz, the pressure exerted by the pulse becomes too strong so that the stream of fluid is distrubed resulting in the production of tiny particles which are ejected in a series of streams which randomly fluctuate in width. It is found that with the ratio L/O' lying between 0.15 and 1.0 inclusive, preferably in the neighborhood of 0.25 and with the writing unit being activated at repetition rates up to 30 kHz, the fluid is discharged in a stabilized manner.

Another factor that must be taken into account is the ratio of the diameter ($d_1$) of the smaller diameter portion of the inner chamber portion 3 to the diameter D'. With the pulse repetition rate being varied up to 30 kHz as described above, the writing unit 1 is operated satisfactorily if the ratio lies between 0.05 and 0.4 inclusive. If the ratio ($d_1$/D') is greater than 0.4 the pressure exerted by the metal membrane 5 is not effectively transmitted to the connecting channel 4 and thus no fluid is discharged, while if the ratio is smaller than 0.05, strong pressure will be produced in the liquid in the inner chamber portion 3 and the discharged fluid stream is disturbed producing tiny particles as described above. The preferable value of the ratio is in the neighborhood of 0.15.

Still another factor which influences the fluid ejection performance of the writing unit is the ratio of the spacing (S) between the opposing walls of the larger diameter portion 3'' of the inner chamber portion 3 to the diameter D'. The ratio S/D' should preferably lie between 0.01 and 0.05 and most preferably in the neighborhood of 0.025.

It was also found that one edge of the inner chamber portion 3 opposite to the connecting channel 4 is preferably chamfered as illustrated in FIG. 4 so that smaller diameter portion of inner chamber portion 3 gradually continuously opens into larger diameter portion 3'' to provide smooth flow of fluid for effective transmission of pressure caused by the metal membrane 5.

In accordance with the invention, the usable pulse repetition rate is extended to a rate higher than 30 kHz when the writing unit 1 is constructed to have the intermediate reservoir chamber 13 and to have the dimensional ratios as described above.

The foregoing description shows only preferred embodiments of the present invention. Various modifications are apparent to those skilled in the art without departing from the scope of the invention which is only limited by the appended claims. Therefore, the embodiments shown and described are only illustrative, not restrictive.

What is claimed is:

1. In an arrangement for applying liquid droplets to a surface, comprising a liquid applying unit including a chamber having an intake channel connected to a liquid supply container and a discharge channel through which the liquid is discharged from the chamber into the atmosphere, means for producing short duration pressure increases in the liquid in the chamber, the chamber having means dividing the chamber into an outer chamber portion adjacent to the discharge channel and an inner chamber portion, a connecting channel in the dividing means connecting the outer and inner chamber portions, the connecting channel being axially aligned with the discharge channel and the intake channel being communicated with the outer chamber portion, the inner chamber portion having a larger diameter portion in contact with the pressure producing means and a smaller diameter portion adjacent to the connecting channel, the improvement comprising:

an intermediate reservoir chamber communicated with said outer chamber portion and with said intake channel; and the ratio of the diameter of said larger diameter portion to the distance between the outer end of said discharge channel and said pressure producing means ranges from 0.15 to 1.0 inclusive, whereby the liquid discharged through said discharge channel is replenished with the liquid in said intermediate reservoir chamber to enable the liquid in said outer chamber portion to respond to the rapid variations of said short duration pressure increases.

2. The improvement of claim 1, wherein said intermediate reservoir chamber is an annular groove extending axially in a direction opposite to said outer chamber portion.

3. The improvement of claim 2, wherein the depth of said annular groove is greater than the spacing between the opposing walls of said outer chamber portion.

4. The improvement of claim 1, wherein said ratio is in the neighborhood of 0.25.

5. The improvement of claim 1, wherein the ratio of the diameter of said larger diameter portion to the diameter of said smaller diameter portion lies between 0.05 and 0.4 inclusive.

6. The improvement of claim 5, wherein said ratio is in the neighborhood of 0.15.

7. The improvement of claim 1, wherein the ratio of the diameter of the larger diameter portion to the spacing between the opposing walls of said larger diameter portion lies between 0.01 and 0.05, inclusive.

8. The improvement of claim 7, wherein said ratio is in the neighborhood of 0.025.

9. The improvement of claim 1, wherein said inner chamber portion has its inner wall coated with a high polymer material.

10. The improvement of claim 1, wherein the ratio of the diameter of said larger diameter portion to the diameter of said smaller diameter portion lies between 0.05 and 0.4 inclusive, and wherein the ratio of the diameter of the larger diameter portion to the spacing between the opposing walls of said larger diameter portion lies between 0.01 and 0.05 inclusive.

11. The improvement of claim 1, wherein said inner chamber portion has its inner wall coated with a high polymer material.

12. The improvement of claim 1, wherein said inner diameter portion gradually continuously opens into said outer diameter portion at the junction therebetween.

* * * * *